United States Patent
Lewis et al.

(10) Patent No.: US 7,102,771 B2
(45) Date of Patent: Sep. 5, 2006

(54) CONTROL OF OUTPUTS FROM A PRINTING DEVICE

(75) Inventors: Johnny M. Lewis, Meridian, ID (US); Gregory A. Vaughn, Meridian, ID (US); Thomas S. Gale, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1046 days.

(21) Appl. No.: 10/141,240

(22) Filed: May 7, 2002

(65) Prior Publication Data

US 2003/0210416 A1  Nov. 13, 2003

(51) Int. Cl.
*G06K 15/00* (2006.01)
*G06K 1/00* (2006.01)
*B41B 1/00* (2006.01)

(52) U.S. Cl. ............... 358/1.14; 358/1.12; 358/1.13; 358/1.15

(58) Field of Classification Search ............. 358/1.15, 358/1.14, 1.13, 1.12, 1.1, 471
See application file for complete search history.

(56) References Cited

U.S. PATENT DOCUMENTS

| 5,453,982 | A | 9/1995 | Pennington et al. ........ 370/235 |
| 5,651,114 | A | 7/1997 | Davidson, Jr. |
| 5,761,397 | A | 6/1998 | Bagley et al. ............. 358/1.15 |
| 2003/0210416 | A1* | 11/2003 | Lewis et al. ............... 358/1.13 |
| 2005/0066144 | A1* | 3/2005 | Alferness et al. ........... 711/170 |
| 2005/0086447 | A1* | 4/2005 | Miyamoto et al. .......... 711/163 |

FOREIGN PATENT DOCUMENTS

| EP | 0556549 A1 * | 8/1993 |
| EP | 0662656 | 7/1995 |
| EP | 1061450 | 12/2000 |
| JP | 10--44557 | * 2/1998 |

* cited by examiner

*Primary Examiner*—Jerome Grant, II

(57) ABSTRACT

System, including method and apparatus, for controlling printing device outputs by selectively fulfilling or denying corresponding output requests based on the class of each output request. The class may be determined by the type of each request and/or the specific input port through which each request is received.

30 Claims, 2 Drawing Sheets

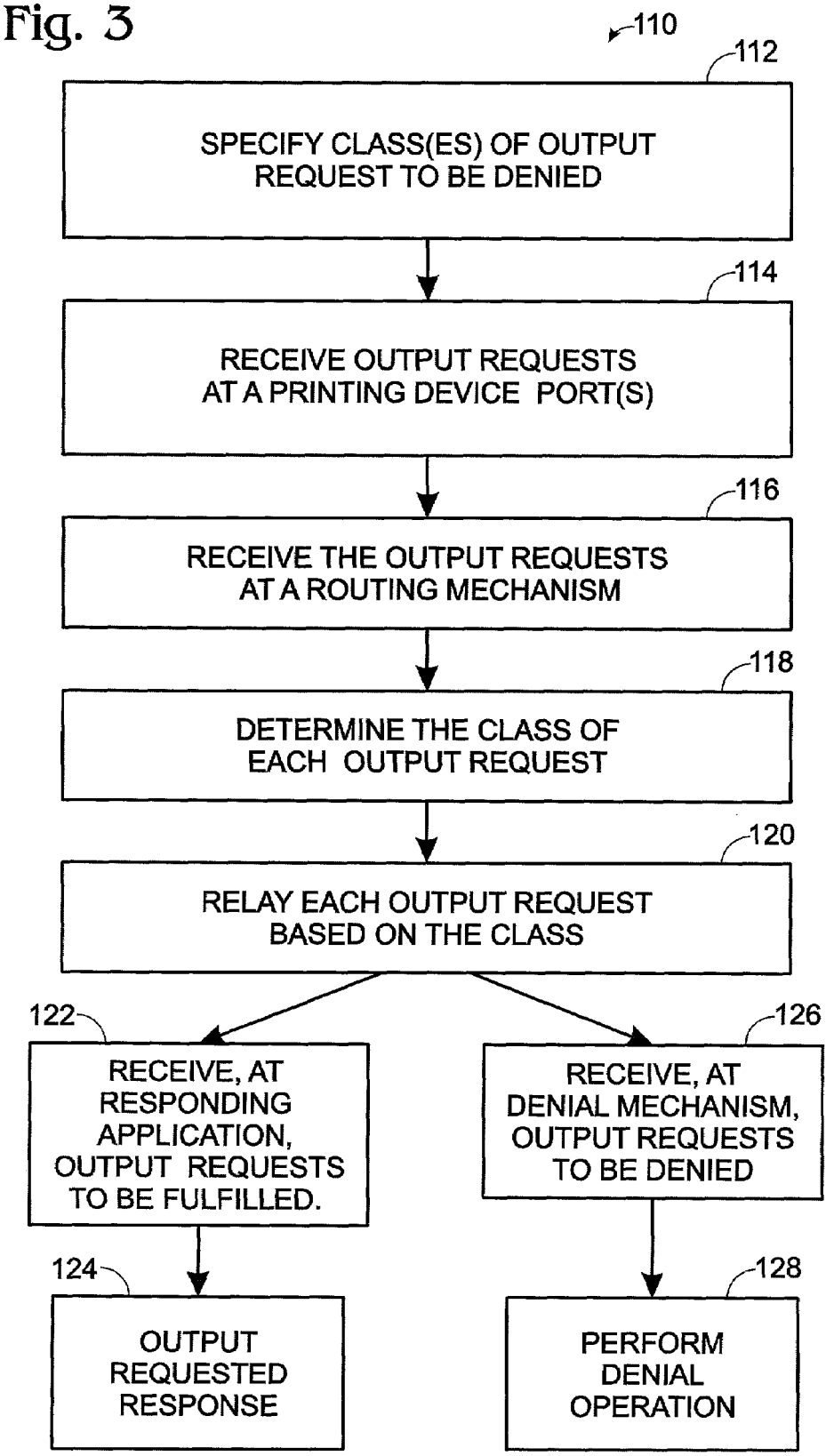

CONTROL OF OUTPUTS FROM A PRINTING DEVICE

BACKGROUND OF THE INVENTION

A networked printer may provide a valuable printing service to many different users that connect to the printer. To function effectively and flexibly, such a printer generally should be capable of receiving print requests through two or more distinct physical connection sites or ports on the printer. Each of these ports may be configured to communicate with users located at different distances and/or through distinct communication modes. Accordingly, a multi-port printer may receive some print requests through a first port that is directly connected to a personal computer, through a second port that communicates with a wide area network, through a third port that receives wireless requests, and/or so on. This type of arrangement may increase the number of printers available to each user and the number of users that can access each printer, improving the efficiency with which suitable printers are matched with a given print job. For example, mobile users may send print jobs to printers based on the proximity of the printers. In addition, a greater number of printers with special capabilities, such as high resolution, high speed, or color, may become available to each user.

Despite the value of placing a printer on a network, this network connectivity also may cause some problems in printer management. For example, some printers are not physically accessible to specific users at certain times. Such printers may be located in an office or in a section of a building that is locked or requires a security clearance at night. If users are allowed to print to such printers during times of restricted access, consumable printing supplies may be wasted. For example, a user may not be able to retrieve the printed material in a timely fashion and may turn to another printer, one that is accessible. Thus the materials printed first may be duplicated, forgotten, and wasted. One solution would be to turn off the printer to avoid unauthorized or inefficient use of the printer. However, this solution prevents the printer from being ready for users who are authorized and/or have physical access to the printer. Accordingly, to optimize resources the printer should always be ready to print for the users who are authorized and have access to the printer, but should deny immediate printing for the unauthorized user without access.

If these different types of users were connected through different printer ports, one approach for controlling printing would be to physically disconnect one of the ports to deny print requests from that one port. However, this approach may require that a printer administrator be physically present at appropriate times for disconnecting and reconnecting the port. Furthermore, this approach also may be disadvantageous because the disconnected users cannot easily receive any information about printer specifications or status, for example, whether the printer might be suitable at another time or is currently ready to print (includes paper, ink, etc.). By contrast, disconnected users that could access such information might be able to initiate printing through a different printer port, for example, by entering a restricted area in a building. Therefore, a system is needed that maintains connectivity through each printer port while selectively blocking print requests received from designated ports.

SUMMARY OF THE INVENTION

A system is provided, including method and apparatus, for controlling printing device outputs by selectively fulfilling or denying corresponding output requests based on the class of each output request. The class may be determined by the type of each request and/or the specific input port through which each request is received.

BRIEF DESCRIPTION OF THE DRAWINGS

FIG. 3 is a flow diagram of a method for selectively denying output requests based on the class of each output request, in accordance with an embodiment of the present invention.

DETAILED DESCRIPTION OF THE PREFERRED EMBODIMENT

Systems, including methods and apparatus, are provided for controlling printing device outputs by selectively fulfilling or denying corresponding output requests, based on the class of each output request. The printing device may be configured to selectively route each output request to either an appropriate responding application, to fulfill output requests, or to a denial mechanism to deny output requests. Such selective routing may be carried out according to the class of each output request. The class may relate to the specific input port(s) through which an output request was received and/or to the type of output requested, such as printing a print job or providing status information about the printing device, among others.

A printing device administrator may regulate this selective routing, either by local or remote interaction with the printing device. In either case, the printing device administrator may select a route for a class of output requests, by inputting a value. For example, the administrator may assign a value that specifies denial of print jobs received through a given port of the printing device. The denial may result in deleting, ignoring, saving, postponing fulfillment of, responding with a denial reply to, and logging receipt of such print jobs, among others. Printing devices configured according to the present invention may provide more flexible control of printing device function, allowing specific tasks performed by a printing device to be individually controlled according to the port that requested each task. In addition, such printing devices may allow remote control by administrators to optimize effective use of the printing devices.

Figure 1:
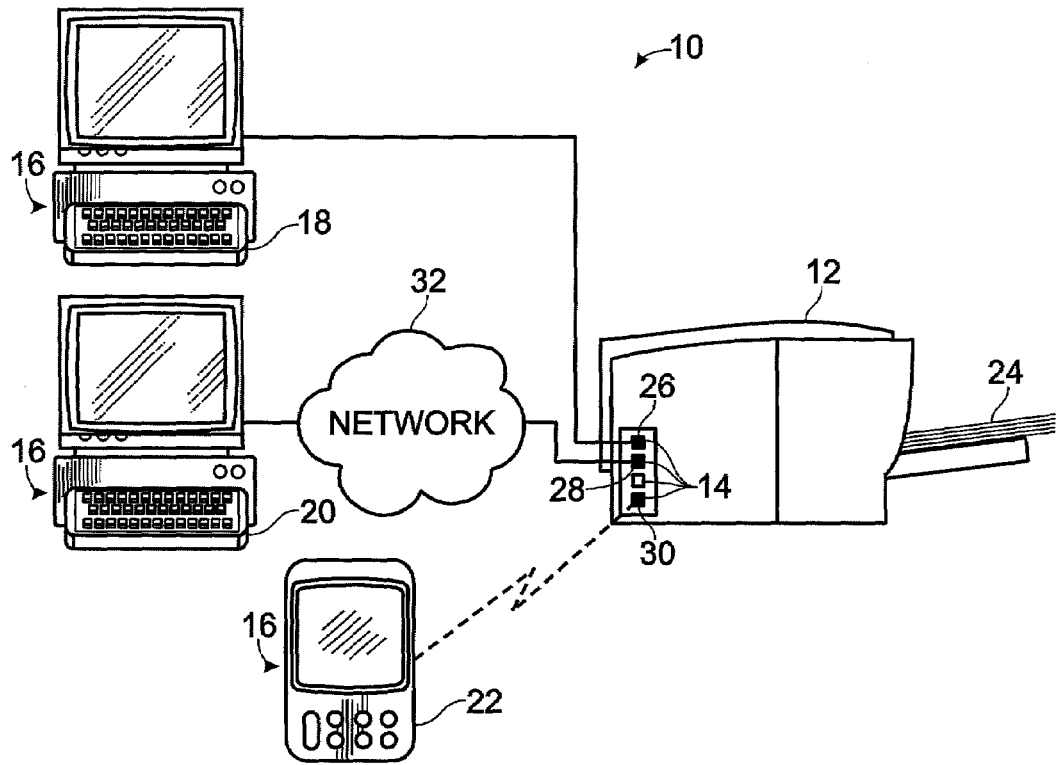
FIG. 1 is a view of a system for selectively controlling output of a printing device based on the class of each corresponding output request, in accordance with an embodiment of the present invention.

FIG. 1 shows a system 10 configured to selectively control fulfillment/denial of output requests sent to a printing device based on the class of each output request. System 10 thus typically includes a printing device 12 having plural ports 14 for receiving and sending data. Each port 14 may be used to provide a data path for connection to one or more requesting devices 16. Requesting devices 16 may include directly connected devices such as personal computer 18, network-connected devices, such as personal computer 20, devices connected through wireless communication, such as personal digital assistant 22, and/or the like. Each requesting device may send output requests through one of ports 14.

Printing device 12, based on the class of each output request, may selectively fulfill or deny each output request. The class of an output request may be related to the specific port through which the request was received. For example, printing device 12 may be configured to print documents 24 based on print jobs received through a direct port 26 from personal computer 18, and through a network port 28 from personal computer 20. However, printing device 12 also may be configured to deny print job requests received through a wireless port 30. Alternatively, or in addition, the class of an output request may be related to the type of output requested. For example, printing device 12 may be configured to fulfill requests for printing-device status information received through port 30, but to deny print job requests received through this same port.

Printing device 12 generally includes any electronically controlled device for converting digital information into a spatially distributed, optically detectable, physical representation of the digital information. Examples of printing devices may include devices that form a relatively permanent image on a substrate, such as laser printers, inkjet printers, dot-matrix printers, copiers, facsimile machines, or the like.

Ports 14 generally include any input/output structures on printing device 12 that are capable of receiving data from a requesting device. Ports may receive data in electronic and/or optical form, among others. In addition, ports may be configured to receive data in one or more specific formats such as those received by parallel ports, TCP/IP ports, serial ports, USB ports, IR ports, network ports, and/or the like. Furthermore, ports may receive/send data that is grouped together as a single unit, or in separate packets. Printing device 12 may include one, two, three, or more ports. FIG. 1 shows printing device 12 having four ports, three of which, shown at 26, 28, 30, are operatively connected to the requesting devices. Printing device 12 also may include other input mechanisms, besides ports, to enable manual introduction of information (for example, a keypad, a keyboard, and/or a mouse/display monitor, among others).

Requesting devices may include any device capable of digital processing. Requesting devices generally include a processor or controller that allows digital information to be sent to, and generally received from, printing device 12. Requesting devices may include personal computers (such as desktop and laptop types, among others), mainframe computers, personal digital assistants, digital telephones, scanners, facsimile machines, photocopiers, and/or the like. Each requesting device may be part of a network 32, such as a local area network (LAN) or wide area network (WAN). Accordingly, each port 14 may be connected to one, two, or more requesting devices 16. One or more of the requesting devices, or printing device 12 itself, may enable a printing device administrator to input control information. A printing device administrator is any person and/or distinct device authorized to oversee some aspect of printing device operation and/or to grant permission to use the printing device.

Figure 2:
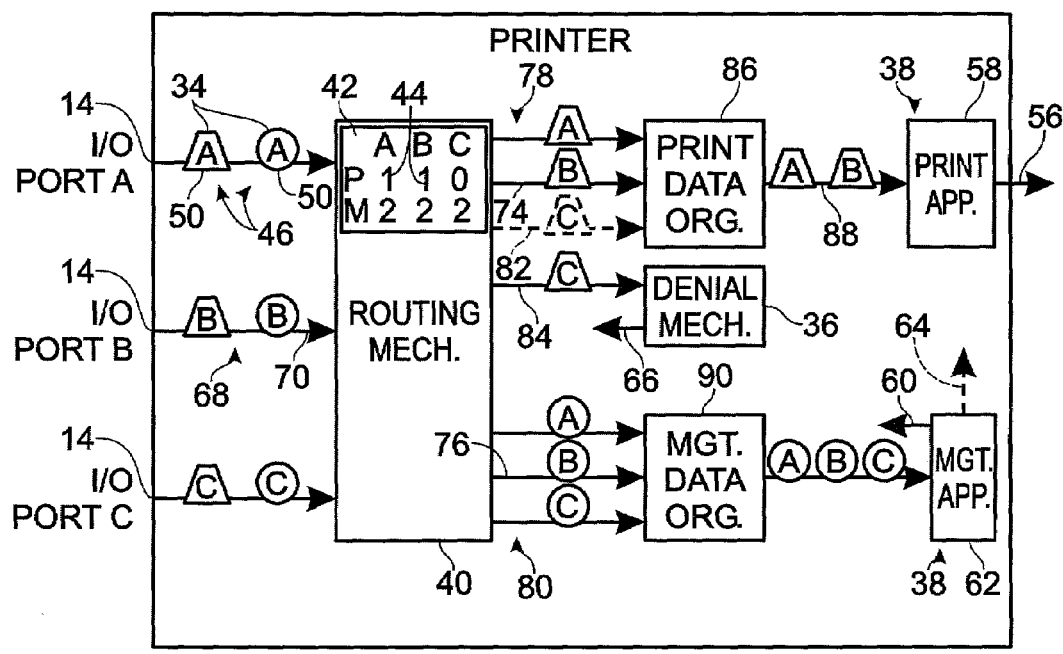
FIG. 2 is a flow diagram illustrating operation of a routing configuration for the printing device of FIG. 1, in which the configuration routes output requests based on the class of each output request, in accordance with an embodiment of the present invention.

FIG. 2 shows a flow diagram illustrating operation of a routing configuration for printing device 12. Printing device 12 may be configured to direct output requests 34 from input-output ports, shown as PORT A, PORT B, and PORT C, to either denial mechanism 36 or one or more responding applications 38 (shown on the right side of FIG. 2). Routing mechanism 40 may act intermediate to ports 14 and mechanism/applications 36, 38 to route each request 34. Routing may be determined within routing mechanism 40 by a routing table 42 that includes routing values 44. Values 44 may specify routes for specific classes of output requests, as described below, toward either denial mechanism 36 or one of applications 38.

Each output request 34 may belong to a class 46. Class 46 may be defined at least partially by the identity of a specific one of the ports 14, through which a specific output request is received, referred to as a requesting port or port of origin. For example, output requests received through Port A have class 46 partially defined here as "A," those through Port B as "B," etc. Alternatively, or in addition, class 46 may be defined at least partially by a type 50 of output requested. Output requests 34 in the example of FIG. 2 are of two types 50. A printing output request, for example, a request that printing device 12 print data sent through a port, is represented herein by a trapezoid. In contrast, a management output request, for example, a request for "management" information from the printing device, is represented herein by a circle. Accordingly, identity of a requesting port and of a request type 50, alone or in combination, may define a class 46 of output request 34. In some embodiments, each class may be defined at least partially by the specific identity of a requesting device, alternatively or in addition to the identity of the requesting port.

Request type 50 generally relates to the type of operation requested of printing device 12. For example, in printing device 12 of FIG. 2, the two types of requests described herein relate to whether a printing device is asked to output information received from outside the printing device or output information related to the printing device itself.

Outputted information received from outside the printing device is generally referred to as printed output 56 (or printing). Production of printed output 56 may be controlled by print application 58. Print application 58 may be a software application that prepares input data for printing by a printing mechanism (not shown) on printing device 12, sends the prepared data to the mechanism, and/or controls the mechanism. All requests for printed output 56 (printing requests) may be considered as the same type 50 of output request. Alternatively, distinct modes of printing may be considered as distinct types of output request. For example, black-and-white printing, printing documents with a nonstandard ink, printing documents on greater than a threshold number of pages, printing documents on a nonstandard substrate, and/or printing documents of a particular format, each may be considered as a distinct type 50 of output request.

Outputted information related to the printing device itself generally is referred to as management output 60. Management output 60 may be directed by management application 62. Management output 60 may include any output related to printing-device status information. For example, management output/printing-device status information may include information related to toner or ink levels, available inks/toners, printing device warm-up status, available input trays and/or tray sizes, paper level(s) and/or type(s), available printing device memory, printing device software/hardware configurations, whether the printing device is busy printing another print job(s), how many other jobs are waiting, ink levels, types of ink, other printing device specifications, connectivity, and/or so on. Similar to printed output 56, all management output 60 may be considered as the same type of output request. Alternatively, distinct management output requests may be considered as distinct types of output request. Management output may be sent, by management application 62, back to a port, such as the requesting port, and/or, in some cases, to print application 58, shown at 64. An output request for management output 60 to be printed generally is not considered as a printing request, for the purposes of this description.

Routing to denial mechanism 36 is an alternative to routing to a responding application 38. Denial mechanism 36 generally includes any operation on an output request 34 related to denying fulfillment of that output request. Accordingly, operation of denial mechanism 36 may cause an output request 34 to be deleted, ignored, saved but not fulfilled, saved and postponed, and/or recorded as being received. Denial mechanism 36 also may send a denial response to the requesting port for delivery to the requesting device. For example, the denial response may inform the requesting device that the output request was denied, shown at 66. Denial mechanism 36 may be a nonproductive pathway for routing denied output requests by routing mechanism 40, or may be a hardware or software mechanism or application that performs one or more denial operations.

Routing mechanism 40 may be any mechanism of printing device 12 for selectively directing output requests toward either an appropriate responding application 38 or toward a denial mechanism 36, based on the class of each output request. The routing mechanism may be a software or a hardware construct. Routing mechanism 40 of FIG. 2 is shown as a multiplexer that is capable of resolving combined data streams (indicated by plural output requests at 68), received from a port along a single physical channel 70. Each physical channel 70 may include two (or more) logical channels that carry output requests 34 corresponding to printing output requests and management output requests. Combined data streams may be converted into distinct data streams 74, 76, corresponding to the two types of output request. Thus, different types of output requests may flow along distinct routes 78, 80, shown extending from the right-hand side of routing mechanism 40. However, in some embodiments, the multiplexer function of the routing mechanism may not be required. For example, each requesting port may carry only a single type of output request (for example, if printing and management requests are considered to be of the same type 50). Alternatively, the multiplexer function may be carried out by a distinct multiplexer mechanism that provides routing mechanism 40 with output requests already resolved according to the type of output request. In either of these alternative embodiments, routing mechanism 40 still typically routes output requests 34 toward either an appropriate responding application 38 or a denial mechanism 36.

Routing conducted by routing mechanism 40 may include default routes (pathways) and/or administrator-specified routes (pathways). Default routes include any routes for specific types and/or classes of output requests 34 that require no administrator input to specify. Such default routes may be alterable by administrator input, or may be fixed. Fixed default routes may include routes for certain types and/or classes of output requests for which an output is always desired. For example, printing device 12 may be configured so that management output requests always follow fixed default routes to management application 62. Alterable default routes and/or administrator-specified routes may allow specific types and/or classes of output requests 34 to be selectively routed toward an appropriate responding application 38 or denial mechanism 36.

Routing table 42 specifies routes (and/or fulfillment/denial) for specific types and/or classes of output requests 34 and may be modified at least partially by administrator input. Routing table 42 generally includes values 44 that specify individual routes for types and/or classes of output requests 34. Such values 44 may correspond to numbers and/or binary configurations, and may be stored in nonvolatile or volatile memory of printing device 12. For example, in FIG. 2 values 44 represent a numerical system that specifies routes, and thus fulfillment or denial for output requests. Each class of output request in routing table 42 is specified as originating from port A, B, or C and being a printing output request ("P") or a management output request ("M"). A value at each position in table 42 defines a route. In the present illustration, "0" specifies a route to denial mechanism 36 (for class "PC"), "1" specifies a route to print application 58 (for classes "PA" and "PB"), and "2" specifies a route to management application 62 (for classes "MA," "MB," and "MC"). Some or all of these values may be fixed values, or variables that are specified by an administrator. Alternatively, or in addition, some or all of values 44 of routing table 42 may be routing configurations themselves rather than separate numbers representing routing configurations.

Flow of output requests 34 through routing mechanism 40 in FIG. 2 typically is typically as follows. Requesting ports send two types of output requests along each physical channel. Routing mechanism 40, based on values 44 in routing table 42, routes requests toward either print application 58 or management application 62. Print output requests generally leave routing mechanism 40 along data routes 78, whereas management output requests generally leave routing mechanism 40 along data routes 80. However, in this example, routing mechanism 40 does not route print output request "C" toward print application 58, (indicated by a dashed path 82). Instead, value "0" in routing table 42 for printing output request C routes this request along an alternate path 84 to denial mechanism 36, so that this request is denied.

Printing and management requests may be directed toward fulfillment by responding applications 38 as follows. Printing output requests PA and PB may be demultiplexed and organized into coherent units by print data organizer 86 and passed as a single data stream 88 to print application 58 by a print data language parser (not shown). Single stream 88 may provide for each request to be operated on separately by print application 58, thereby producing printed output 56. Similarly, each management request MA, MB, MC may be directed to management data organizer 90, which may demultiplex and organize each management request into a coherent unit(s). The management requests then may be passed to a management data language parser (not shown) that provides the management application with operable units. Management application, in turn, may provide management output 60 (and/or 64).

FIG. 3 shows a flow diagram of a method 110 for selectively denying output requests based on the class of each output request. The printing device may be readied for desired routing of the output requests by receiving input(s), such as a value that specifies a class or classes of output request to be denied, as shown at 112. The value typically specifies a route for a given class of output requests. The value may be saved in a routing table and/or applied to a routing mechanism, so that the routing mechanism may be readied. Next, the printing device may receive output requests at a printing device port or ports, as shown at 114, which in turn, may relay the output requests to a routing mechanism. The output requests may be received at the routing mechanism, as shown at 116. Based on identifying information in the output requests, such as header information and/or a physical channel from which the routing mechanism receives each output request, the routing mechanism may determine the class of each output request, as shown at 118. Next, the routing mechanism may relay each output request based on the class, as shown at 120. Relaying may be determined by the route specified by the value(s) received from the printing device administrator. Furthermore, relaying from the routing mechanism may be to one of two pathways. A first pathway directs output requests to a responding application for fulfillment. For each output request received by the responding application, as shown at 122, the requested response may be outputted, as shown at 124. As described above, the responding application may include two or more distinct applications, such as a print application and a management application. By contrast, a second pathway directs output requests to a denial mechanism, which receives such output requests, shown at 126. The denial mechanism then may perform one or more denial operations for each output request to be denied, as shown at 128 and described above.

It is believed that the disclosure set forth above encompasses multiple distinct embodiments of the invention. While each of these embodiments have been disclosed in its preferred form, the specific embodiments thereof as disclosed and illustrated herein are not to be considered in a limiting sense as numerous variations are possible. The subject matter of this disclosure thus includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

What is claimed is:

1. A method of controlling a printing device including at least one port configured to receive output requests, comprising:
   receiving output requests through the at least one port, each of the output requests corresponding to one of plural classes; and
   selectively denying the output requests based on the class to which each output request corresponds.

2. The method of claim 1, wherein the class is determined by at least one of 1) type of output request and 2) identity of a specific one of the at least one port that received such output request.

3. The method of claim 2, wherein the type is one of plural types, at least one of the plural types being one of a request for printed output and a request for printing-device status information.

4. The method of claim 2, wherein selectively denying is based on only one of 1) the type of output request and 2) the identity of a specific one of the at least one port that received such output request.

5. The method of claim 2, wherein the class is determined by both 1) the type of output request and 2) the identity of a specific one of the at least one port that received such output request.

6. The method of claim 1, wherein the at least one port includes plural ports.

7. The method of claim 1, which further comprises specifying the selectively denied output requests by input from an administrator of the printing device.

8. The method of claim 1, wherein denying includes performing at least one of deleting, ignoring, saving, postponing fulfillment of, responding with a denial reply to, and logging receipt of the denied output requests.

9. The method of claim 1, which further comprises fulfilling the output requests that are not denied.

10. The method of claim 1, wherein denying is restricted to output requests for printed output.

11. A method of controlling a printing device including plural ports configured to receive output requests, comprising:
   receiving output requests through the plural ports, each of the output requests being received through one of the plural ports and corresponding to one of plural output request types; and
   selectively denying the output requests based on the port through which each output request was received and the type of such output request.

12. The method of claim 11, wherein the plural output request types include at least one of a request for printed output and a request for printing-device status information.

13. The method of claim 11, which further comprises specifying the selectively denied output requests by input from an administrator of the printing device.

14. The method of claim 11, wherein denying includes performing at least one of deleting, ignoring, saving, postponing fulfillment of, responding with a denial reply to, and logging receipt of the denied output requests.

15. The method of claim 11, which further comprises fulfilling other of the output requests that are distinct from the denied output requests.

16. A printing device, comprising:
   plural ports configured to receive output requests, each of the output requests corresponding to one of plural classes;
   a denial mechanism configured to deny fulfillment of selectively relayed output requests; and
   a routing mechanism configured to selectively relay to the denial mechanism the output requests received at the plural ports, based on the class to which such output requests correspond.

17. The printing device of claim 16, wherein the class is determined by at least one of 1) type of output request and 2) identity of a specific one of the plural ports that received such output request.

18. The printing device of claim 17, wherein the type of output request is one of plural types, at least one of the plural types being one of a request for printed output and a request for printing-device status information.

19. The printing device of claim 17, wherein the class is based on only one of 1) the type of output request and 2) the identity of a specific one of the plural ports that received such output request.

20. The printing device of claim 17, wherein the class is determined by both 1) the type of output request and 2) the identity of a specific one of the plural ports that received such output request.

21. The printing device of claim 16, which further comprises a responding application, the responding application being configured to fulfill output requests not selectively relayed to the denial mechanism.

22. The printing device of claim 16, wherein the denial mechanism is configured to perform at least one of deleting, ignoring, saving, postponing fulfillment of, responding with a denial reply to, and logging receipt of the selectively relayed output requests.

23. A program storage device readable by a processor, tangibly embodying a program of instructions executable by the processor to perform steps for controlling a printing device including at least one port that is configured to receive and relay output requests, the steps comprising:

receiving output requests relayed from the at least one port, each of the output requests corresponding to one of plural classes; and selectively denying the output requests based on the class to which such output requests correspond.

24. The program storage device of claim 23, wherein the class is defined by at least one of 1) type of output request and 2) identity of the at least one port receiving such output request.

25. The program storage device of claim 24, wherein the type is one of plural types, the plural types including one of a request for printed output and a request for printing-device status information.

26. The program storage device of claim 24, wherein the class is determined by both 1) the type of output request and 2) the identity of a specific one of the at least one port that received such output request.

27. The program storage device of claim 23, wherein the at least one port includes plural ports.

28. The program storage device of claim 23, the denied output requests being at least partially specified by input from an administrator of the printing device.

29. The program storage device of claim 23, wherein denying includes performing at least one of deleting, ignoring, saving, postponing fulfillment of, responding with a denial reply to, and logging receipt of the denied output requests.

30. The program storage device of claim 23, which further comprises fulfilling the output requests that are not denied.

\* \* \* \* \*